(12) United States Patent (10) Patent No.: US 8,189,930 B2
Renders et al. (45) Date of Patent: May 29, 2012

(54) CATEGORIZER WITH USER-CONTROLLABLE CALIBRATION

(75) Inventors: Jean-Michel Renders, Quaix-en-Chartreuse (FR); Caroline Privault, Montbonnot-Saint-Martin (FR); Eric H. Cheminot, Meylan (FR)

(73) Assignee: Xerox Corporation, Norwalk, CT (US)

( * ) Notice: Subject to any disclaimer, the term of this patent is extended or adjusted under 35 U.S.C. 154(b) by 985 days.

(21) Appl. No.: 12/174,721

(22) Filed: Jul. 17, 2008

(65) Prior Publication Data

US 2010/0014762 A1 Jan. 21, 2010

(51) Int. Cl.
*G06K 9/74* (2006.01)
*G06K 9/62* (2006.01)

(52) U.S. Cl. ........................................ 382/228; 382/224
(58) Field of Classification Search .................. 382/224, 382/228
See application file for complete search history.

(56) References Cited

U.S. PATENT DOCUMENTS

| | | | |
|---|---|---|---|
| 7,089,241 B1 | 8/2006 | Alspector et al. | |
| 7,139,754 B2 | 11/2006 | Goutte et al. | |
| 2003/0101187 A1 | 5/2003 | Gaussier et al. | |
| 2005/0105780 A1* | 5/2005 | Ioffe | 382/118 |
| 2005/0187892 A1 | 8/2005 | Goutte et al. | |
| 2006/0136410 A1 | 6/2006 | Gaussier et al. | |
| 2007/0005340 A1 | 1/2007 | Goutte et al. | |
| 2007/0005639 A1 | 1/2007 | Gaussier et al. | |
| 2007/0143101 A1 | 6/2007 | Goutte | |
| 2007/0239745 A1 | 10/2007 | Guerraz et al. | |
| 2008/0069456 A1 | 3/2008 | Perronnin | |

OTHER PUBLICATIONS

Zadrozny et al., Transforming classifier scores into accurate multiclass probability estimates, 2002 ACM.*
Yang, "A Study on Thresholding Strategies for Text Categorization," In Proceedings of SIGIR-01, 24$^{th}$ ACM International Conference on Research and Development in Information Retrieval, ACM Press, pp. 137-145, (2001).
Gaussier et al., "A Hierarchical Model for Clustering and Categorising Documents," ECIR-02, pp. 229-247 (2002).
Sebastiani, "Machine Learning in Automated Text Categorization," Consiglio Nazionale delle Ricerche, Pisa, Italy, (1999), at http://citeseer.ist.psu.edu/sebastiani02machine.html.
Wolpert, "Stacked Generalization," Neural Networks 5, pp. 1-57 (1992) I.

(Continued)

*Primary Examiner* — John Strege
(74) *Attorney, Agent, or Firm* — Fay Sharpe LLP

(57) ABSTRACT

A calibrated categorizer comprises: a multi-class categorizer configured to output class probabilities for an input object corresponding to a set of classes; a class probabilities rescaler configured to rescale class probabilities to generate rescaled class probabilities; and a resealing model learner configured to learn calibration parameters for the class probabilities rescaler based on (i) class probabilities output by the multi-class categorizer for a calibration set of class-labeled objects, (ii) confidence measures output by the multi-class categorizer for the calibration set of class-labeled objects, and (iii) class labels of the calibration set of class-labeled objects, the class probabilities rescaler calibrated by the learned calibration parameters defining a calibrated class probabilities rescaler. In a method embodiment, class probabilities are generated for an input object corresponding to a set of classes using a classifier trained on a first set of objects, and are rescaled to form rescaled class probabilities using a resealing algorithm calibrated using a second set of objects different from the first set of objects. The method may further entail thresholding the rescaled class probabilities using thresholds calibrated using the second set of objects or a third set of objects.

20 Claims, 4 Drawing Sheets

OTHER PUBLICATIONS

Kryszczuk et al., "Q-stack: Uni- and Multimodal Classifier Stacking with Quality Meaures," in Proceedings of the International Workshop on Multiple Classifier Systems, Czech Republic, pp. 367376, (2007) I.

Krishnapuram et al., "Sparse Multinomial Logistic Regression: fast Algorithms and Generalization Bounds," IEEE Transactions on Pattern Analysis and Machine Intelligence, vol. 27, No. 6, pp. 957-968 (2005) I.

Calvo et al., "Managing Content with Automatic Document Classification," Journal of Digital Information, vol. 5, Issue 2, Article No. 282, pp. 1-15 (2004) I.

Polikar, "Ensemble Based Systems in Decision Making," IEEE Circuits and Systems Magazine, vol. 6, No. 3, pp. 21-45 (2006) I.

Siersdorfer et al., "Goal-oriented Methods and Meta Methods for Document Classification and their Parameter Tuning," in Proceedings of the 13 Acm international conference on information and knowledge management, pp. 59-68 (2004).

* cited by examiner

RANKING 1 FOR CATEGORY c

T=0.66
{
| 0.9 | d#22 | + |
| 0.85 | d#17 | + |
| 0.84 | d#0 | - |
| 0.79 | d#110 | + |
| 0.78 | d#54 | - |
| 0.67 | d#3 | + |
| 0.65 | d#139 | + |
| ... | | |
| 0.13 | d#96 | - |
}

FalsePositive=2

FIG. 4

RANKING 2 FOR CATEGORY c

T=0.66
{
| 0.89 | d#17 | + |
| 0.88 | d#22 | + |
| 0.82 | d#110 | + |
| 0.79 | d#0 | - |
| 0.68 | d#3 | + |
| 0.67 | d#139 | + |
| 0.65 | d#54 | - |
| ... | | |
| 0.11 | d#96 | - |
}

FalsePositive=1

FIG. 5

CATEGORIZER WITH USER-CONTROLLABLE CALIBRATION

BACKGROUND

The following relates to the information processing arts, object categorization arts, and related arts.

Multi-class categorization of objects, such as documents, images, or so forth, is a task that is advantageously automated. In a typical approach, a training set of objects are collected, and each object of the training set is assigned to one or more classes to which the object belongs. In a multi-class task, the classes are selected from a set of classes. The class assignments are typically done manually for the training set, (but they can come from any other sources as well). The labeled training set is used to train a categorizer. A categorizer typically includes a set of statistical tables (encoding manual input labeling) plus a runtime algorithm for interpreting those tables, with both the tables and the algorithm suitably embodied by a computer or other processing device, and/or by memory or other storage. The categorizer is designed to extract, or receive as input, features of an input object, and the categorizer is trained or otherwise configured based on the labeled training documents to assign the input object to one or more classes based on the extracted or received features of the input object. In soft categorization, a given input object may be assigned a degree of membership in different classes, with the degree of membership being in the range [0,1]. In hard categorization a given object is either wholly assigned to a given class or wholly excluded from a given class. In other words, the output of a hard classifier for a given input object and a given class is binary, e.g. "0" or "1", or "yes" or "no", or so forth. A hard categorizer may be derived from a soft categorizer by adding a layer of processing that receives the soft classification and makes a binary "yes/no"-type membership decision for each input class.

The training process has a substantial effect on performance of the multi-class categorizer. Indeed, to a large degree the training defines the categorizer. Multi-class categorizer performance is determined or affected by numerous factors that are established during training, such as the quality or characteristics of the training set, and constraints, objectives, trade-offs, or other considerations embodied in the objective function or other decisional mechanism that is optimized or configured by the training, such as performance trade-off recall/precision that may be applied or optimized during the training. The training process is also computationally complex and time consuming. Accordingly, one typically would like to train the categorizer once, using a substantial training set of objects that are representative of characteristics of input objects that are expected to be encountered by the categorizer.

In practice, however, the constraints, objectives, trade-offs, or other considerations under which the trained multi-class categorizer is applied may differ from the constraints, objectives, trade-offs, or other considerations employed during the training. For example, if the training set is constructed from objects obtained from the global Internet, but the trained categorizer is applied to input objects taken from a corporate database having statistical characteristics differing from those of the global Internet, one can expect the applied categorizer performance to be less than ideal. Similarly, if assumptions or constraints applied during training are different from those the end-user wants to apply, performance will likely suffer. For example, if the training included a constraint that the precision be greater than a certain threshold, then the precision exhibited by the trained categorizer in categorizing input objects that are statistically similar to the training set is likely to be similar to the constraint threshold used in the training. However, the end-user may want a higher precision than the threshold value used in the training, or conversely may be willing to accept a lower precision in return for improvements elsewhere, such as in recall.

One solution to such problems is to re-train the categorizer using a new set of training objects derived from the source of interest (e.g., the corporate database in the previous example), and/or using parameter constraints that comport with the performance the end-user wishes to obtain. However, such re-training is computationally intensive and time-consuming. Retraining also fails to make use of the (possibly extensive) training that the categorizer initially underwent. If the end-user is not experienced in or does not adequately understand the categorization training process, such an end-user may make mistakes in the retraining (for example, by using a training set of insufficient size or insufficient diversity of characteristics) that result in the retrained categorizer having degraded performance as compared with the initially trained categorizer.

Still further, in some circumstances the end-user may not receive or have access to the software or programmed processor used to perform the training process. For example, in one business model the end-user provides a categorizer manufacturer with a set of training data, and the manufacturer performs the training and delivers only the trained categorizer to the end-user, but not the training system components. In such a circumstance, the end-user does not have the requisite tools to perform re-training, and may be unwilling or unable to go back to the manufacturer to have the re-training performed by the manufacturer.

As yet another consideration, in soft categorization a given input object is associated with a probability to belong to each class. These soft probabilities are optionally transformed into hard categorization by adding a layer of processing that receives the soft classification probabilities against each class and "binarizes" the results by using thresholding or another binary decision mechanism to assign a single (or optionally several) classes to the input object. This optional assignment process is dependent upon the constraints of precision and recall that the user may expect; and conversely the assignment process impacts the final precision and recall of the categorizer, making it advantageous to have a mechanism for controlling and driving this interdependency between recall and precision so as to tune the categorizer performance.

BRIEF DESCRIPTION

In some illustrative embodiments disclosed as illustrative examples herein, a calibrated categorizer is disclosed, comprising: a multi-class categorizer configured to output class probabilities for an input object corresponding to a set of classes; a class probabilities rescaler configured to rescale class probabilities; and a rescaling model learner configured to learn calibration parameters for the class probabilities rescaler based on (i) class probabilities output by the multi-class categorizer for a calibration set of class-labeled objects, (ii) confidence measures output by the multi-class categorizer for the calibration set of class-labeled objects, and (iii) class labels of the calibration set of class-labeled objects; the class probabilities rescaler calibrated by the learned calibration parameters defining a calibrated class probabilities rescaler.

In some illustrative embodiments disclosed as illustrative examples herein, a categorization method is disclosed, comprising: applying a multi-class categorizer to a calibration set of class-labeled objects to generate calibration class probabilities corresponding to a set of classes for objects of the calibration set of class-labeled objects; calibrating a resealing model based on (i) the calibration class probabilities, (ii) confidence measures related to the calibration class probabilities, and (iii) class labels of the calibration set of class-labeled objects; applying the multi-class categorizer to generate input object class probabilities corresponding to the set of classes for an input object; and resealing the input object class probabilities using the calibrated resealing model to generate rescaled input object class probabilities.

In some illustrative embodiments disclosed as illustrative examples herein, a categorization method is disclosed, comprising: generating class probabilities for an input object corresponding to a set of classes, the generating employing a classifier trained on a first set of objects; and resealing the generated class probabilities to form rescaled class probabilities, the resealing employing a resealing algorithm calibrated using a second set of objects different from the first set of objects.

BRIEF DESCRIPTION OF THE DRAWINGS

FIGS. 4 and 5 set forth tables showing two rankings for selected documents and including for each document the conditional probability (re-ranked in the case of FIG. 5) and an indication ("+" or "−") of whether the document was wrongly or correctly assigned to the class c according to the reference labeling provided by a calibration or training set, and according to the threshold value T (where T=0.66 for FIGS. 4 and 5).

DETAILED DESCRIPTION

Figure 1:
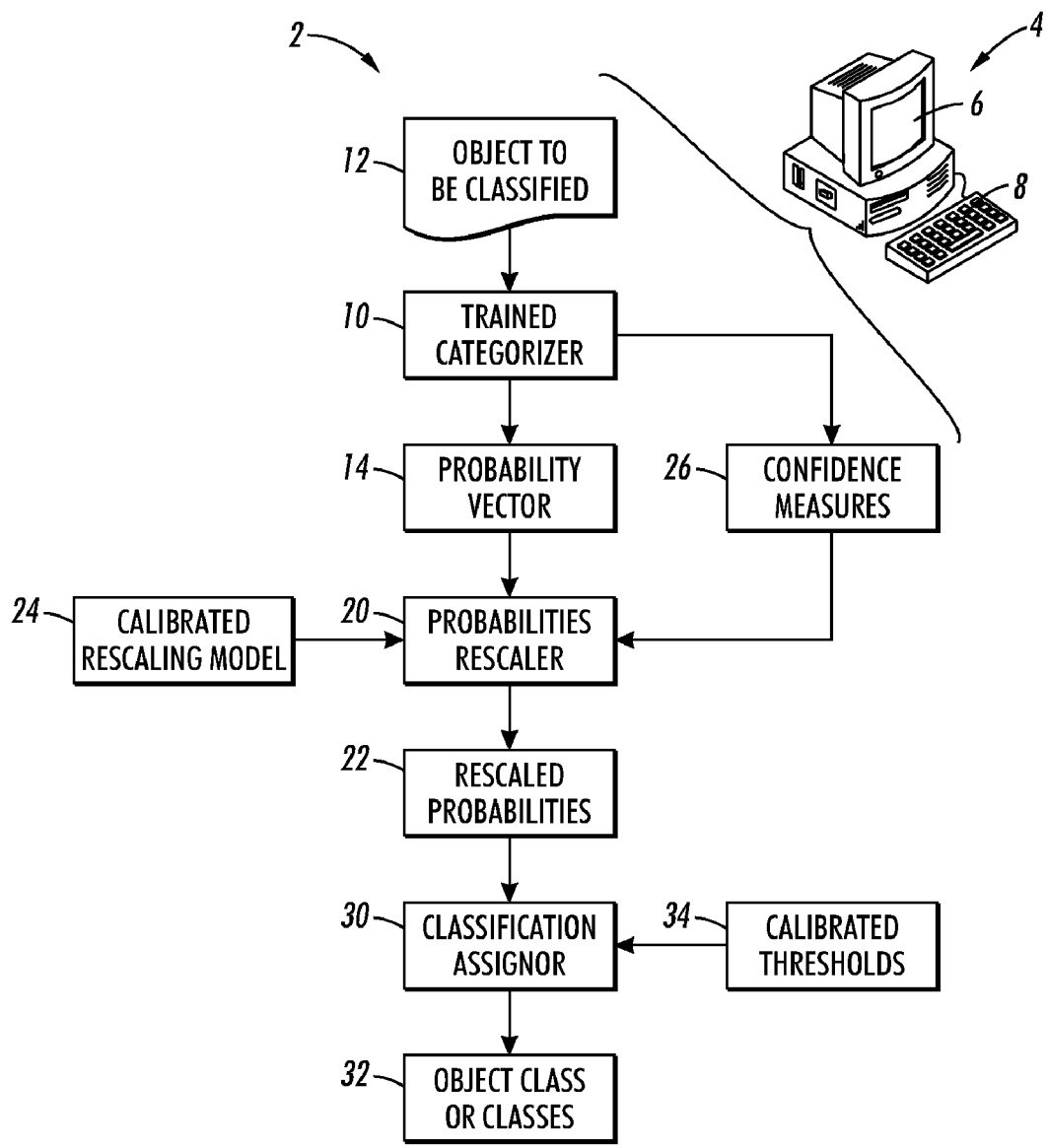
FIG. 1 diagrammatically shows a categorizer employing a calibrated class probabilities rescaler and calibrated thresholds.

With reference to FIG. 1, a calibrated categorizer 2 is suitably embodied as a digital data processing-capable device such as an illustrated computer 4 including a user interface including a printer, illustrated display 6, or other output device or devices and a mouse, illustrated keyboard 8, or other input device or devices. The user interface enables a user to select input objects for classification and to receive perceptible output identifying class labels or other indications of the output of the calibrated categorizer 2. The illustrated computer 4 is an example, and more generally the categorizer can be embodied by any digital data processing-capable device with available user interfacing capability. For example, the categorizer can be embodied in whole or in part by a mainframe computer, desktop computer, laptop computer, personal data assistant (PDA), Internet server accessed by a dumb terminal, personal computer, or other user interfacing-capable device, or so forth. The computer 4 or other digital data processing-capable device is configured to execute software or otherwise embody components such as an illustrated trained multi-class categorizer 10.

The calibrated categorizer 2 employs the trained multi-class categorizer 10 to classify an input object 12. The multi-class categorizer 10 is configured or trained to classify objects of a selected type. For example, the categorizer 10 may be configured or trained to classify text-based documents, or may be configured or trained to classify images, or may be configured or trained to classify audio-video files or content, or so forth. The categorizer 10 employs a classification algorithm suitable for classifying the input object 12 of the selected type. In some illustrative examples set forth herein, the objects are text-based documents and the multi-class categorizer 10 employs a probabilistic latent semantic analysis (PLSA) classification algorithm. Other types of soft multi-class classification algorithms are also suitable depending upon the type of objects being categorized.

The output of the multi-class categorizer 10 is a vector 14 of class probabilities. The value of each vector element of the probability vector 14 is indicative of a probability, according to the categorizer 10, that the object belongs to a corresponding class of a set of classes. For example, if the set of categories or classes is denoted as $C=\{c_1, c_2, \ldots, c_N\}$ and the probability vector 14 output by the categorizer 10 for the input object 12 is denoted as $P=\{p_1, p_2, \ldots, p_N\}$, then $p_1$ indicates the probability according to the categorizer 10 that the input object 12 belongs to the class $c_1$, and $p_2$ indicates the probability according to the categorizer 10 that the input object 12 belongs to the class $c_2$, and so forth. Ordinarily, a probability vector is by definition a normalized vector, such that the sum $p_1+p_2+ \ldots +p_N$ equals unity. However, normalization is not necessary for the present applications, and in some embodiments the probability vector 14 (as that term is used herein) is not normalized, while in other embodiments the probability vector 14 is normalized. The categorizer 10 typically employs a soft classification, in that (for normalized probabilities) the probabilities $p_1, p_2, \ldots, p_N$ can have values other than 0 and 1 indicating a probabilistic likelihood of membership in multiple classes.

The trained multi-class categorizer 10 has been trained using a suitable approach. Typically, the training employs a training set of objects that are annotated with class labels, and parameters of the classifier are optimized such that the probability vectors output for the objects of the training set optimally match the class label annotations. (As used herein, terms such as "optimal", "optimized", "maximized", or so forth are to be understood as indicating substantial optimization or maximization, and encompass an output that, for example, is substantially maximized but is not necessarily the global maximum).

The categorizers disclosed herein employ the trained multi-class categorizer 10, but do not rely solely upon the output of the categorizer 10 in assigning class labels or identifications to input objects. It is recognized herein that the categorizer 10 when applied to objects from a particular source may have degraded performance compared with the performance for the training set. For example, consider a training set of objects that is text-based documents obtained by random Internet searches. The multi-class classifier trained on such a training set can be expected to exhibit good performance, on average, in classifying other objects obtained in random fashion from the Internet. However, the classifier may not perform as well, on average, on documents selected from another source, such as a corporate information database, due to systematically different statistical characteristics of the corporate information database as compared with global Internet content. As another example, the categorizer 10 may have been trained to meet certain performance characteristics, such as a selected precision or recall value. A particular user of the trained classifier, however, may define quality of performance differently, for example preferring to have relatively higher precision at the cost of a relatively lower recall.

On the other hand, it is recognized herein that the trained multi-class categorizer 10 has undergone computationally intensive and time-consuming training, and is expected to perform relatively well even when the input objects exhibit statistical deviations from the training set of objects, or even when the particular user has somewhat different criteria for quality of performance. It is disclosed herein to make use of the trained multi-class categorizer 10, but to calibrate (in other words, adjust) the outputs so that its performance after adjustment accommodates different preferences, different source object statistical characteristics, or so forth. The disclosed calibration process adjusts the outputs of the trained multi-class categorizer 10, but does not perform a retraining of the categorizer 10. As a result, the calibration can be performed using a calibration set of objects that is smaller than and less diverse than would be advisable for a training set of objects. Additionally, the disclosed calibration process is substantially faster and more computationally efficient than the process of retraining the categorizer 10.

To accommodate different preferences, different source object statistical characteristics, or so forth, the calibrated categorizer 2 employs the categorizer 10 in conjunction with a subsequently applied calibrated components including a probabilities rescaler 20 that rescales the probabilities of the probabilities vector 14 to generate rescaled probabilities 22. In some embodiments the rescaled probabilities 22 may be normalized so that the rescaled probabilities sum to unity. However, this is not necessary, and in some embodiments the rescaled probabilities 22 are not normalized. The rescaler 20 employs a calibrated resealing model 24 defining parameters of the probabilities rescaler 20 selected to enhance the categorization accuracy for objects from a particular source or database, or selected to adjust the probabilities to comport with preferences of the person or entity utilizing the categorizer, such as ensuring, to the extent possible, a minimum level of precision or recall. In performing the resealing, the illustrated probabilities rescaler 20 makes use of confidence measures 26 output by the trained multi-class categorizer 10 along with the probabilities vector 14. For example, some suitable confidence measures may include outlier measures, ambiguity measures, or so forth.

With continuing reference to FIG. 1, the rescaled probabilities 22 are input to a classification assignor 30 that assigns or associates with the input object 12 one or more class labels or identifications 32. In hard categorization, the classification assignor 30 assigns a single class to the input object 12, whereas for soft categorization the classification assignor 30 may assign one or more classes to the input object 12, with various likelihoods or fractions of membership in the various assigned classes. In some embodiments disclosed herein, the calibrated categorizer 2 includes as a further calibrated component calibrated thresholds 34 that are used by the classification assignor 30 for selecting the class label or identification (or multiple class labels or identifications in the case of soft categorization) so as to enhance the categorization respective to specific objects being categorized, or to comport with preferences of the person or entity utilizing the categorizer.

Figure 2:
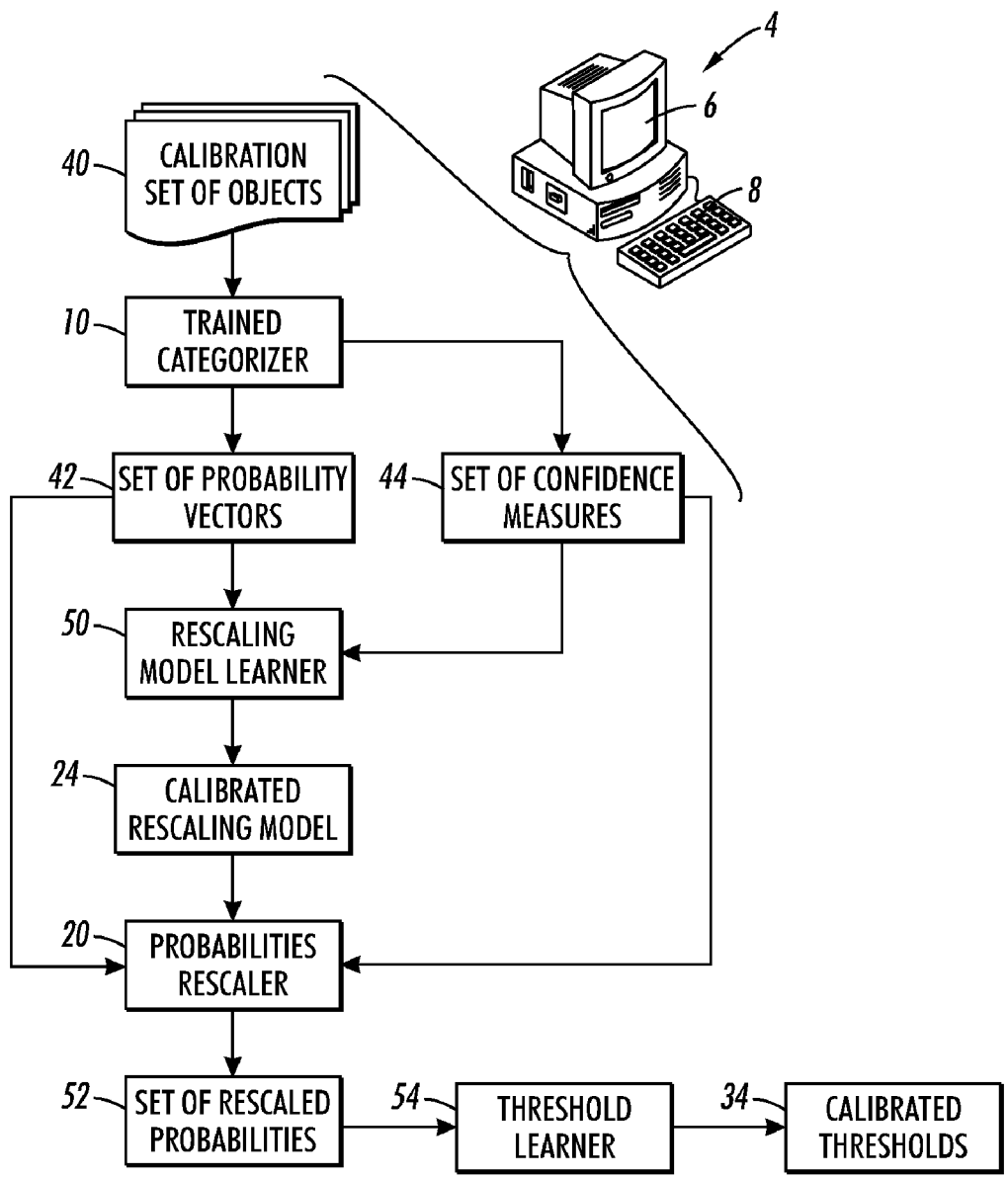
FIG. 2 diagrammatically shows a system suitable for generating the calibrated resealing model and calibrated thresholds used in FIG. 1.
Figure 3:
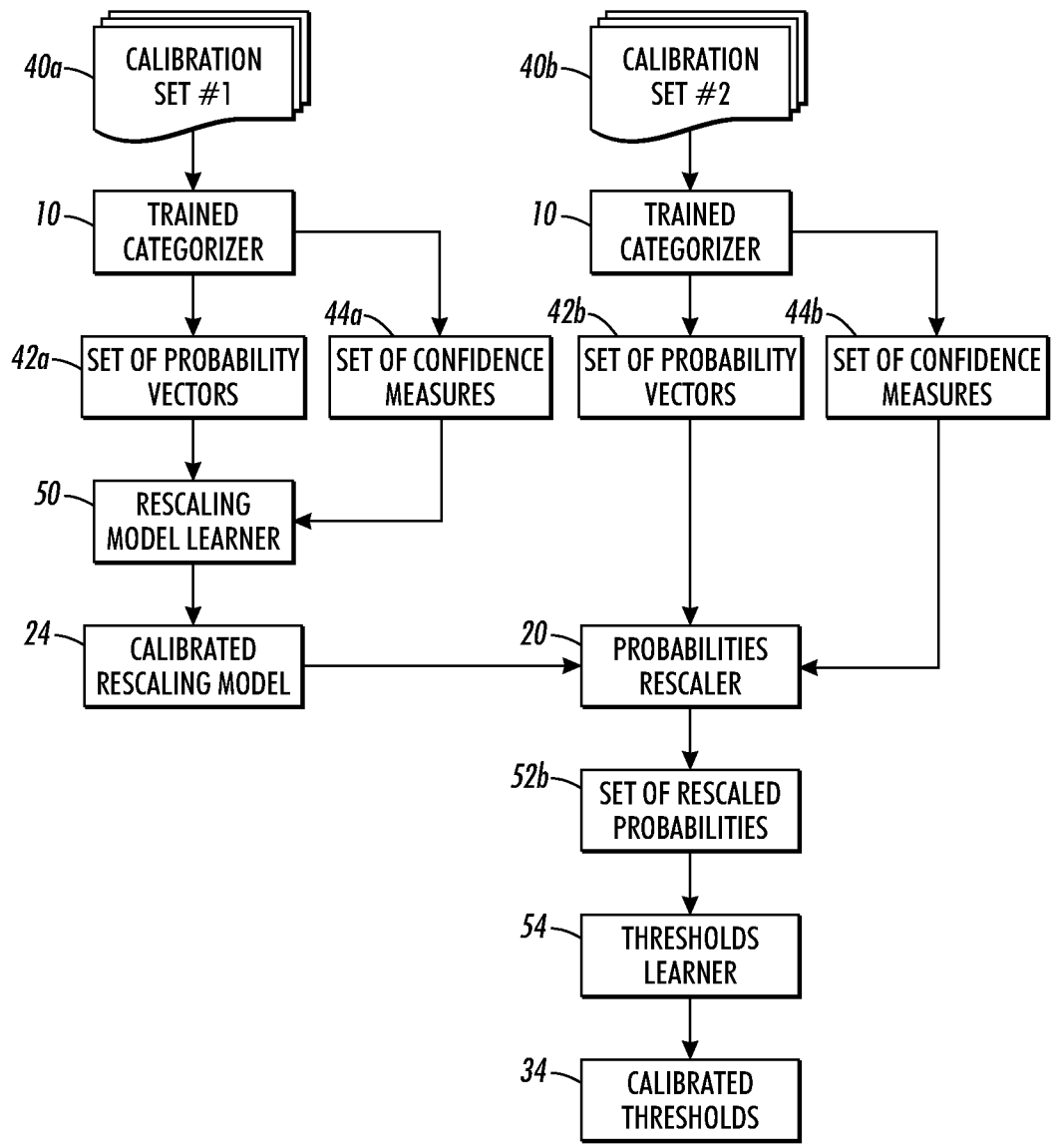
FIG. 3 diagrammatically shows another system suitable for generating the calibrated resealing model and calibrated thresholds used in FIG. 1.

FIGS. 2 and 3 diagrammatically illustrate two illustrative embodiments of a calibration sub-system for generating the calibrated resealing model 24 and the optional calibrated thresholds 34. The calibration sub-system is suitably embodied as a digital data processing-capable device such as the illustrated computer 4 or another digital data processing-capable device configured to execute software or otherwise embody components of the calibration sub-system. In some embodiments, the same digital data processing-capable device, e.g. the same computer 4, embodies both the calibrated categorizer 2 and the calibration sub-system. It should be noted that the trained categorizer 10 was trained on a training set of labeled objects which is generally different from the calibration set of labeled objects 40, 40a, 40b used by the calibration sub-system to perform the calibration of the trained categorizer 10. In some embodiments, however, such as in the case in which no extra set of labeled data distinct from the training set is available, it is also contemplated to use the same data set for both training and calibration, that is, the set of training data can optionally be reused to play the role of a calibration set. In yet other variations, there may be partial overlap between the training data set and the calibration data set.

With particular reference to FIG. 2, one embodiment of the calibration sub-system operates on a single calibration set of objects 40, which may be the same as or different from the set of training objects (not illustrated) that was used to train the trained categorizer 10. For example, in one application the set of training objects may have been derived from the Internet while the calibration set of objects 40 may have been derived from a corporate database to which the calibrated categorizer 2 is to be applied. This enables the calibrated resealing model 24 and calibrated thresholds 34 to be specific to the corporate database. As another example, the calibration set of objects 40 may be the same as the set of training objects that was used to train the trained categorizer 10, but the generation of the resealing and optional thresholds is performed so as to modify the categorization to comport with preferences of the person or entity utilizing the calibrated categorizer 2, such as providing a selected precision or a selected recall.

The calibration set of objects 40 is input to the trained categorizer 10, which computes a probability vector for each object of the calibration set of objects 40 so as to generate a set of probability vectors 42 corresponding to the calibration set of objects 40. The illustrated trained categorizer 10 also outputs a set of confidence measures 44 corresponding to the set of probability vectors 42.

The objects of the calibration set of objects 40 are labeled with class labels associating the objects with classes of the set of classes $C=\{c_1, c_2, \ldots, c_N\}$. A resealing model learner 50 is configured to learn calibration parameters for the class probabilities rescaler 20 based on (i) class probabilities 14 output by the trained multi-class categorizer 10 for the calibration set of class-labeled objects 40 and (ii) the class labels of the calibration set of class-labeled objects 40. The resealing model learner 50 further learns the calibration parameters for the class probabilities rescaler 20 based on (iii) the confidence measures 44 output by the trained multi-class categorizer 10 for the calibration set of class-labeled objects 40. The output of the resealing model learner 50 is the calibrated resealing model 24 calibrated by the learned calibration parameters.

In the calibration sub-system embodiment of FIG. 2, the calibrated resealing model 24 is applied to the set of probability vectors 42 by the probabilities rescaler 20 to generate a set of rescaled probabilities 52, for example formulated as a set of rescaled probability vectors corresponding to the calibration set of objects 40. These rescaled probabilities 52 serve as input to a thresholds learner 54 that is configured to learn the calibrated thresholds 34 for the thresholding performed by the classification assignor 30 based on (i) the rescaled calibration class probabilities 52 and (ii) the annotated class labels of the calibration set of class-labeled objects 40. The thresholds learner 54 determines the calibrated thresholds 34 so as to satisfy a selected recall, precision, or other criterion. The calibrated thresholds 34 are used by the classification assignor 30.

In the calibration sub-system embodiment illustrated in FIG. 2, the same calibration set of objects 40 is used both for learning the calibrated resealing model 24 and for learning the calibrated thresholds 34. Alternatively, different calibration sets can be used for these two different learning tasks.

With reference to FIG. 3, a calibration sub-system embodiment is illustrated which employs: (i) a first calibration set of objects 40a for learning the calibrated resealing model 24, and (ii) a second calibration set of objects 40b for learning the calibrated thresholds 34. The objects of the first calibration set of objects 40a are categorized by the trained categorizer 10 to generate a first set of probability vectors 42a and a corresponding first set of confidence measures 44a. Independently, the objects of the second calibration set of objects 40b are categorized by the trained categorizer 10 to generate a second set of probability vectors 42b and a corresponding second set of confidence measures 44b. The first set of probability vectors 42a and an optional corresponding first set of confidence measures 44a are input to the resealing model learner 50 to generate the calibrated resealing model 24. Then, the calibrated resealing model 24 derived from the first calibration set of objects 40a is used by the probabilities rescaler 20 to rescale the second set of probability vectors 42b to generate a set of rescaled probabilities 52b corresponding to the second set of probability vectors 42b. The thresholds learner 54 then operates on the set of rescaled probabilities 52b corresponding to the second set of probability vectors 42b to generate the calibrated thresholds 34.

To further illuminate the calibrated categorizer 2 described with reference to FIGS. 1-3, an example is set forth which operates on document objects and uses an embodiment of the trained multi-class categorizer 10 that employs probabilistic latent semantic analysis (PLSA) as the categorization algorithm. PLSA is a generative model that models the joint probability of documents (d) and words (w). A {term, document} matrix is developed. Such a matrix can be normalized by the total number of observations to generate an empirical joint distribution of terms and words, which is modeled using a mixture of multinomials as follows:

$$P(w, d) = \sum_C P(c)P(w|c)P(d|c) = \sum_C P(c|d)P(w|c)P(d), \quad (1)$$

where: P(c) is the probability of each class c of the set of classes C; P(d|c) is the probability of a document d given a class c; and P(w|c) is the probability of a word w given a class c, also called the "profile" of the class c. The parameters P(c), P(d|c), P(w|c), or other additional or different probabilistic parameters, are obtained during a supervised training phase in which the trained categorizer 10 is generated. In a suitable training approach, the likelihood of the set of training objects (documents, in this case) are maximized using the Expectation-Maximization (EM) algorithm or a variant of the EM algorithm.

The training phase generates a categorizer model that can be used at runtime for classifying an input document. For an input document d, this runtime process approximates the conditional probability vector P(c|d), which is the probability vector 14 for this example.

Using this PLSA categorizer as an example, operation of the classification assignor 30 and the thresholds learner 54 is described. The rescaled probabilities 22 are in this example evaluated by the classification assignor 30 according to a maximum probability rule, in which the input document d is assigned to that class c for which the conditional probability vector P(c|d) after resealing by the probabilities rescaler 20 has an element of maximum value. Other selection strategies can also be used; for example, in some embodiments the input document d is assigned to any class for which the conditional probability vector P(c|d) after resealing is larger than a threshold value. The thresholds learner 54 considers the rescaled probabilities of each calibration document individually and checks for its computed class in comparison with the annotated class provided in the annotated calibration set 40, 40b. A global model micro-average precision can be computed as:

$$P_{micro} = \frac{\sum_{d \in CalibrationSet} CorrectlyAssigned(d)}{|CalibrationSet|}, \quad (2)$$

where CorrectlyAssigned(d) is 1 if the document was assigned to the correct class and 0 otherwise. In Equation (2), the documents for which no class was found are not subtracted from |CalibrationSet|, that is, empty documents, or documents whose content was completely filtered out after pre-processing. Consider a quantitative illustrative example in which the user would like the categorizer model to achieve a global precision of 0.9 on the calibration set 40, 40b, with a constraint that each class achieve a 0.9 precision. Setting a threshold for each class c on the computed P(c|d) value of each class can contribute to achieving these specifications. One way of computing these thresholds is as follows. In STEP 1, for each class c in the model, obtain the whole set of documents $\mathcal{D}$ in the calibration set 40, 40b. In STEP 2, rank the documents in $\mathcal{D}$ by increasing value of p(c|d) to obtain a ranked list of documents $\mathcal{L}$. In STEP 3, assign all documents to class c. In other words, set the initial values #CorrectlyAssignedDocs=|c| and #AssignedDocs=$\mathcal{D}$, initialize $$maxPrecision = P_c = \frac{|c|}{|\mathcal{D}|},$$

that is, the precision at 100% recall, and initialize the threshold $t(c)=t(c)_{max}=p(c|d_0)$, with $d_0$ being the first document in the ranked list of documents $\mathcal{L}$. In STEP 4, for each next document $d_1, \ldots, d_i, \ldots \in \mathcal{L}$ and while (maxPrecision<0.9) perform the following operations: set the threshold $t(c)=p(c|d_i)$; update #AssignedDocs−=1; update #CorrectlyAssignedDocs−=1 if $d_{i-1}$ was actually labeled with c within $\mathcal{D}$; update $$P_c = \frac{\# CorrectlyAssignedDocuments}{\# AssignedDocuments};$$

and, if (maxPrecision<$P_c$) then update maxPrecision$P_c$ and $t(c)_{max}=t(c)$. In STEP 5, return maxPrecision and $t(c)_{max}$ as the result for class c, then go back to STEP 1 to process a next class if any. The condition (maxPrecision)<$P_c$ ensures that the precision globally increases but can also have also some local decrease. In this circumstance, the first encountered maximum precision is kept that meets the user target precision. In some instances this maximum precision may be somewhat above the user target precision. In STEP 4, if two consecutive documents $d_{i-1}$, $d_i$ in the list are duplicate documents thus achieving the same probability $p(c|d_{i-1})=p(c|d_i)$, then t(c) does not change and neither #AssignedDocs nor #CorrectlyAssignedDocs are updated; if on the contrary t(c) changes but a sub-list of n successive duplicate documents are encountered until $d_{i-1}$, then when t(c) changes this should be accompanied by an automatically decrease of #AssignedDocs by n and at the same time if (and only if) the sub-list up to $d_{i-1}$ was made of documents actually labeled with c within $\mathcal{D}$ then #CorrectlyAssignedDocs should also be decreased by n.

When the thresholds learner 54 completes STEPS 1-5, each class is associated with one of the calibrated thresholds 34 that is used at runtime for deciding to which class an input document should be assigned. Various rules can be applied for assigning a document to a class using the calibrated thresholds 34. For instance, one suitable rule is to assign an input document d to a class $$c = \underset{\forall c: p(c|d) > t(c)}{\operatorname{argmax}} (p(c \mid d)).$$

Another suitable rule is to assign an input document d to a class $$c = \underset{\forall c: p(c|d) - t(c) > 0}{\operatorname{argmax}} (p(c \mid d) - t(c)).$$

The conditional probabilities p(c|d) used in STEPS 1-5 correspond to the probability vectors before resealing. However, the rescaled probabilities (denoted herein as $\hat{p}(c|d)$) can be substituted for the conditional probabilities p(c|d) in STEPS 1-5 so that the calibrated thresholds 34 are appropriate for application to the rescaled probabilities $\hat{p}(c|d)$.

In an alternative embodiment, the thresholds are computed by applying STEPS 1-5 only on those documents of the calibration set 40, 40b that achieve their highest probability on the current class c. To implement this embodiment, the STEP 1 can be revised to become STEP 1' as follows: for each class c in the model, obtain the set of documents S={d∈ $\mathcal{D}$:c=arg max(p(c|d))} and then substitute S for D in the next steps 2-5.

In the above approach, the global user target precision is employed for every class. In other embodiments, different user-defined target precisions are specified for different classes.

In obtaining the calibrated thresholds 34 using STEPS 1-5 or using STEPS 1'-5, the precision globally improves at a cost of a decrease in recall. In some cases this is acceptable.

In other cases, this may not be a desirable result. To counteract this effect in such cases, it should be recognized that the erosion of the recall depends on how well the vector P(c|d) reflects the membership degree of documents d with respect to class c. The list of documents ordered by increasing value of P(c|d) can be seen as a ranking whose reliability determines the precision and recall values. When a threshold is set on this ranking, documents above the limit can be true positive as well as false positive. The goal is to find a more reliable ranking so that the number of false positive decreases while most of the documents originally labeled with a reference class c in the calibration set are correctly categorized.

With reference to FIGS. 4 and 5, this is illustrated for a specific example. FIG. 4 illustrates a ranking for documents identified by the middle column, and having rankings listed in the lefthand column. The righthand column shows a "+" sign if the document is correctly classified using the illustrative threshold T=0.66, and shows a "−" sign if the document is incorrectly classified using the illustrative threshold T=0.66.

For the ranking of FIG. 4, two documents, namely documents d#0 and d#54, are false positives that are incorrectly classified as belonging to category or class c. FIG. 5 shows the result for a reranking which the document d#54 has a rescaled probability that places it below the threshold T=0.66, hence reducing the number of false positives to one.

Continuing with the PLSA document categorization example, some illustrative embodiments of the probabilities rescaler 20 and the resealing model learner 50 are described. The illustrative approach employs logistic regression, taking into account additional information about the documents in the form of confidence measures 26 that are returned by the trained multi-class categorizer 10. Other categorizers, such as support vector machine (SVM)-based categorizers, give a class-relevance score (which does not need to be a true probability) or other "extra" information that can be used to rerank the probabilities in order to better calibrate the categorization for a particular application. The probabilities rescaler 20 can also be thought of as a second, discriminative, categorizer that is cascaded with the trained multi-class categorizer 10 which is in this example a generative PLSA-based categorizer.

The confidence measures 26 can constitute substantially any measure that supplements the probability vector 14. The illustrative PLSA-based categorizer 10 can be configured to output several such confidence measures that are readily available by-products of the PLSA processing, such as outlier measure or index information or ambiguity measure or index information for each document d processed by the categorizer 10.

A suitable outlier measure or index in the PLSA document categorization context can be defined which reflects how far a document d is from the training data set. In other words, the outlier index is indicative of how likely the document d is, given the observation of the whole training set and the model. An outlier measure or index can be defined in terms of cross-entropy or negative log-likelihood. A cross-entropy outlier index CE can be defined as:

$$CE(d) = -\sum_{w_i \in d} \frac{n(w_i)}{|d|} \log \left( \sum_{c=1,\ldots,K} p(c \mid d) \hat{p}(w_i \mid c) \right). \quad (3)$$

where the term $\hat{p}(w_i|c)$ takes into account the presence of "unknown" words, which are words $w_i$ that are not included in the categorizer model vocabulary $\mathcal{W}$. The vocabulary $\mathcal{W}$ of the model is the set of words encountered and selected over the set of documents used to train the model 10. The excluded words are combined in a single fictive word, called the "unknown word". Therefore, the summation in Equation (3) of CE(d) is over all words, both in the vocabulary $\mathcal{W}$ and the fictive "unknown" word. In a suitable approach, a Jelinek-Mercer smoothing scheme is applied and the term $\hat{p}(w_i|c)$ is defined as $\hat{p}(w_i|c) = \alpha \cdot p(w_i|c) + (1-\alpha) \cdot p_b(w_i)$. In this last equation, $p(w_i|c)$ is the parameter value as estimated by the non-smoothed PLSA algorithm. The term $p(w_i|c)$ is null for every "unknown" word $w_i$. The term $p_b(w_i)$ is a back-off distribution on words. Various reasonable choices can be selected for $p_b(w_i)$, such as $p_b(w_i)=1$ for the unknown words and zero for all vocabulary words in $\mathcal{W}$, or a uniform choice of $$p_b(w_i) = \frac{1}{|\mathcal{W}|+1}$$

for all words $w_i$. The $\alpha$ is a suitable smoothing factor. The outlier measure or index of Equation (3) measures how likely it is that a document d could be generated by the underlying distribution of the training set that was used to train the categorizer 10. It ranges from 0 to +∞, the value for the "more likely" documents being theoretically 0.

A suitable ambiguity measure or index in the PLSA document categorization context can be defined which reflects which are the most "ambiguous" documents, that is, the documents on the margins with respect to the different model classes. One suitable ambiguity measure or index is based on the exponential of the class entropy, using the P(c|d) values as identified by PLSA via the EM algorithm:

$$Ambi(d) = \exp\left(-\sum_C p(c \mid d) \log[p(c \mid d)]\right). \tag{4}$$

This index is larger or equal to one: it is equal to one if the document is completely assigned to a single class; and it is less than or equal to the number of classes K in the set of classes. The index is equal to K in case of uniform soft assignment to each class, which corresponds to maximum ambiguity.

For the purpose of rescaling the probability vectors 42, the combination of the ambiguity, the outlier score and the approximated conditional probabilities is employed by associating each document d with three numerical features (conditional probability, ambiguity index, and outlier index), which generates a 3×N matrix if the entire calibration set 40, 40a is considered, with N=𝒟:

$$\text{Feature matrix for class } c = \begin{bmatrix} P(c \mid d_1) & P(c \mid d_2) & \ldots & P(c \mid d_N) \\ CE(d_1) & CE(d_2) & \ldots & CE(d_N) \\ Ambi(d_1) & Ambi(d_2) & \ldots & Ambi(d_N) \end{bmatrix}. \tag{5}$$

For each class c there are N training samples with the three observed features per training sample. These N training samples are used to design a binary classifier capable of distinguishing between "belonging to class c" and "not belonging to class c".

It is desired to derive a better re-ranking of the class-relevance scores (initially materialized by P(c|d)), by building a discriminative classifier using these new features as inputs and the true class membership of the documents of the calibration set 40, 40a as labels. To provide an illustrative example, a logistic regression classifier is described herein as an illustrative embodiment; however, other types of classifiers can be employed as the second-level classifier.

Defining y=1 as representing "belonging to class c" and y=0 for "not belonging to class c", the linear logistic regression model can be written as:

$$p(y = 1 \mid x^j) = \frac{\exp(\alpha_0 + \alpha_1 * x_1^j + \alpha_2 * x_2^j + \alpha_3 * x_3^j)}{1 + \exp(\alpha_0 + \alpha_1 * x_1^j + \alpha_2 * x_2^j + \alpha_3 * x_3^j)}, \tag{6}$$

where $x^j = \langle x_1^j, x_2^j, x_3^j \rangle$ is the feature vector of the document $d_j$ and $\alpha_0, \alpha_1, \alpha_2, \alpha_3$ are unknown constants that are learned during the logistic regression process.

Logistic regression is a member of a group of statistical models called generalized linear models. It allows one to predict a discrete outcome, such as group membership, from a set of variables that may be continuous, discrete, dichotomous, or a mix of any of these. The logistic regression model is a conditional model that assumes the following relationship between $p(y=1|x^j)$ and $x_1^j, x_2^j, x_3^j$:

$$\log \frac{p(y = 1 \mid x^j)}{1 - p(y = 1 \mid x^j)} = \alpha_0 + \alpha_1 * x_1^j + \alpha_2 * x_2^j + \alpha_3 * x_3^j, \tag{7}$$

where $\alpha = (\alpha_0, \alpha_1, \alpha_2, \alpha_3)$ is the parameter vector to be estimated. The logistic regression model can be fitted using the Maximum Likelihood method or another method, such as Iteratively Reweighted Least Squares (IRLS) with a ridge term. The Maximum Likelihood technique entails setting the parameters to values at which the likelihood of the observed data is maximized.

For the multi-class categorization problem, a different vector of parameters is learned for each class. The combination of parameter vectors for the set of classes can be written as a calibration matrix as follows:

$$\begin{bmatrix} c_1 & c_2 & \ldots & c_k \\ \alpha_0^1 & \alpha_0^2 & \ldots & \alpha_0^k \\ \alpha_1^1 & \alpha_1^2 & \ldots & \alpha_1^k \\ \alpha_2^1 & \alpha_2^2 & \ldots & \alpha_2^k \\ \alpha_3^1 & \alpha_3^2 & \ldots & \alpha_3^k \end{bmatrix}, \tag{8}$$

where k denotes the number of classes in the set of classes. These parameters are used by the probabilities rescaler 20 to compute the rescaled probabilities $\hat{p}(c \oplus d)$ according to:

$$\hat{p}(c \mid d) = \frac{\exp\left(\begin{array}{l}\alpha_0^c + \alpha_1^c * P(c \mid d) + \\ \alpha_2^c * CE(d) + \alpha_3^c * Ambi(d)\end{array}\right)}{1 + \exp\left(\begin{array}{l}\alpha_0^c + \alpha_1^c * P(c \mid d) + \\ \alpha_2^c * CE(d) + \alpha_3^c * Ambi(d)\end{array}\right)}. \tag{9}$$

The rescaled probabilities $\hat{p}(c|d)$ output by Equation (9) are not normalized, that is, the rescaled probabilities $\hat{p}(c|d)$ for a given document summed over the set of classes do not (in general) sum to unity. Optionally, a normalization operation can be performed to normalize the rescaled probabilities. However, the rescaled probabilities $\hat{p}(c|d)$ even without such normalization can be used to generate an updated ranking for each document respective to each class, just as was done with the conditional probabilities P(c|d) before rescaling. With this ranking class thresholds can be computed based on the calibration set 40, 40b using STEPS 1-5 or STEPS 1'-5 as already described. Once the calibration threshold t(c) has been set for each class c, at runtime (e.g., FIG. 1) the assignment decision rule implemented by the classification assignor 30 can be, for example:

$$\text{assign document } d \text{ to class } c = \underset{\forall c: \hat{p}(c|d) > t(c)}{\operatorname{argmax}} [\hat{p}(c \mid d)], \quad (10)$$

or as another example can be:

$$\text{assign document } d \text{ to class } c = \underset{\forall c: \hat{p}(c|d) - t(c) > 0}{\operatorname{argmax}} [\hat{p}(c \mid d) - t(c)]. \quad (11)$$

The choice of the feature data matrix is not limited to the illustrative regressors set forth herein. As another example, the logistic regression could be fed with any feature obtained applying any non-linear transformation of the initial regressors. For example, an alternative quadratic formulation is:

$$\alpha_0 + \alpha_1 \cdot x_1^i + \alpha_2 \cdot x_2^i + \alpha_3 \cdot x_3^i + \alpha_4 \cdot (x_1^i)^2 + \alpha_5 \cdot (x_2^i)^2 + \alpha_6 \cdot (x_3^i)^2 + \alpha_7 \cdot x_1^i \cdot x_2^i + \alpha_8 \cdot x_1^i \cdot x_3^i + \alpha_9 \cdot x_2^i \cdot x_3^i \quad (12)$$

It is made transparent for the logistic regression conditional model by estimating what is now a ten-parameter vector $\alpha = (\alpha_0, \alpha_1, \alpha_2, \alpha_3, \alpha_4, \alpha_5, \alpha_6, \alpha_7, \alpha_8, \alpha_9)$ from a matrix of 9-feature vectors $x^i = \langle x_1^i, x_2^i, x_3^i, x_4^i, x_5^i, x_6^i, x_7^i, x_8^i, x_9^i \rangle$ where:

$$\begin{cases} x_4 = (x_1^i)^2 \\ x_5 = (x_2^i)^2 \\ x_6 = (x_3^i)^2 \\ x_7 = x_1^i \cdot x_2^i \\ x_8 = x_1^i \cdot x_3^i \\ x_9 = x_2^i \cdot x_3^i \end{cases} \quad (13)$$

The set of different vectors of parameters learnt individually for each class, in this embodiment yields a calibration matrix of 10 rows and k columns where k denotes the number of classes in the set of classes.

It should be noted that when using any kernel-based classifier (such as SVM, for example) as the probabilities rescaler 20, the choice of an appropriate kernel is not limited to a linear kernel.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A calibrated categorizer comprising:
a multi-class categorizer configured to output class probabilities for an input object corresponding to a set of classes;
a class probabilities rescaler configured to rescale class probabilities to generate rescaled class probabilities;
a rescaling model learner configured to learn calibration parameters for the class probabilities rescaler based on (i) class probabilities output by the multi-class categorizer for a calibration set of class-labeled objects, (ii) confidence measures output by the multi-class categorizer for the calibration set of class-labeled objects, and (iii) class labels of the calibration set of class-labeled objects, the class probabilities rescaler calibrated by the learned calibration parameters defining a calibrated class probabilities rescaler;
a classification assignor configured to associate an input object with at least one class of the set of classes based on thresholding of rescaled class probabilities for the input object, the rescaled class probabilities being class probabilities output by the multi-class categorizer for the input object and rescaled by the calibrated class probabilities rescaler; and
a thresholds learner configured to learn thresholds for the thresholding performed by the classification assignor based on (i) rescaled calibration class probabilities comprising class probabilities output by the multi-class categorizer for a thresholds calibration set of class-labeled objects and rescaled by the calibrated class probabilities rescaler and (ii) class labels of the thresholds calibration set of class-labeled objects;
wherein the multi-class categorizer, the class probabilities rescaler, the rescaling model learner, the classification assignor, and the thresholds learner comprise a digital data processing device.

2. The calibrated categorizer as set forth in claim 1, wherein the rescaled class probabilities are not normalized.

3. The calibrated categorizer as set forth in claim 1, wherein the confidence measures include outlier measures.

4. The calibrated categorizer as set forth in claim 1, wherein the confidence measures include ambiguity measures.

5. The calibrated categorizer as set forth in claim 1, wherein the thresholds learner is configured to learn the thresholds using the calibration set of class-labeled objects as the thresholds calibration set of class-labeled objects.

6. The calibrated categorizer as set forth in claim 1, wherein the rescaling model learner employs a logistic regression algorithm to learn the calibration parameters for the class probabilities rescaler.

7. The calibrated categorizer as set forth in claim 1, further comprising:
an output device configured to identify at least one class label that is assigned to the input object based on the rescaled class probabilities.

8. The calibrated categorizer as set forth in claim 1, wherein the multi-class categorizer implements a probabilistic latent semantic analysis (PLSA) classification algorithm, and the input object and the class-labeled objects are text-based documents.

9. The calibrated categorizer as set forth in claim 1, wherein the calibration set of class-labeled objects and the thresholds calibration set of class-labeled objects are different sets of objects.

10. A categorization method comprising:
applying a multi-class categorizer to a calibration set of class-labeled objects to generate calibration class probabilities corresponding to a set of classes for objects of the calibration set of class-labeled objects;
calibrating a rescaling model based on (i) the calibration class probabilities, (ii) confidence measures related to the calibration class probabilities, and (iii) class labels of the calibration set of class-labeled objects;
applying the multi-class categorizer to generate input object class probabilities corresponding to the set of classes for an input object; and rescaling the input object class probabilities using the calibrated rescaling model to generate rescaled input object class probabilities;

wherein the categorization method is performed by a digital data processing device.

11. The categorization method as set forth in claim 10, wherein the confidence measures related to the calibration class probabilities include at least one of (i) outlier measures and (ii) ambiguity measures.

12. The categorization method as set forth in claim 10, further comprising:

thresholding the rescaled input object class probabilities to associate the input object with at least one class of the set of classes.

13. The categorization method as set forth in claim 12, further comprising:

outputting an identification of the at least one class associated with the input object.

14. The categorization method as set forth in claim 12, further comprising:

rescaling the calibration class probabilities using the calibrated rescaling model to generate rescaled calibration class probabilities; and computing thresholds that are used in the thresholding based on (i) the rescaled calibration class probabilities and (ii) class labels of the calibration set of class-labeled objects.

15. The categorization method as set forth in claim 12, further comprising:

applying the multi-class categorizer to a thresholds calibration set of class-labeled objects to generate thresholds calibration class probabilities;

rescaling the thresholds calibration class probabilities using the calibrated rescaling model to generate rescaled thresholds calibration class probabilities; and generating thresholds that are used in the thresholding based on (i) the rescaled thresholds calibration class probabilities and (ii) class labels of the thresholds calibration set of class-labeled objects.

16. A categorization method comprising:

generating class probabilities for an input object corresponding to a set of classes, the generating employing a classifier trained on a first set of objects;

rescaling the generated class probabilities to form rescaled class probabilities, the rescaling employing a rescaling algorithm calibrated using a second set of objects different from the first set of objects; and thresholding the rescaled class probabilities using thresholds calibrated using a third set of objects that is different from the first set of objects and is different from the second set of objects;

wherein the categorization method is performed by a digital data processing device.

17. The categorization method as set forth in claim 16, wherein the rescaling receives as inputs at least class probabilities for the objects of the second set of objects generated employing the classifier trained on the first set of objects.

18. The categorization method as set forth in claim 17, wherein the rescaling receives as further inputs confidence measures respective to the class probabilities for the objects of the second set of objects, said confidence measures including at least one of (i) outlier measures and (ii) ambiguity measures.

19. The categorization method as set forth in claim 16, further comprising:

assigning at least one class of the set of classes to the input object based on the rescaled class probabilities; and outputting an identification of the assigned at least one class.

20. The categorization method as set forth in claim 16, further comprising:

calibrating the thresholds using the third set of objects that is different from the first set of objects and is different from the second set of objects.

* * * * *